US007989050B2

(12) United States Patent
Hasch et al.

(10) Patent No.: US 7,989,050 B2
(45) Date of Patent: Aug. 2, 2011

(54) BUILDING SLAB, FLOOR PANELS IN PARTICULAR, AND METHOD OF MANUFACTURING THE SAME

(75) Inventors: Joachim Hasch, Berlin (DE); Dirk Grunwald, Braunschweig (DE)

(73) Assignee: Kronotec AG, Lucerne (CH)

( * ) Notice: Subject to any disclaimer, the term of this patent is extended or adjusted under 35 U.S.C. 154(b) by 520 days.

(21) Appl. No.: 12/104,760

(22) Filed: Apr. 17, 2008

(65) Prior Publication Data

US 2008/0263985 A1 Oct. 30, 2008

(30) Foreign Application Priority Data

Apr. 27, 2007 (DE) ......................... 10 2007 019 978

(51) Int. Cl.
*B32B 3/00* (2006.01)
*B32B 5/12* (2006.01)
*B44F 9/02* (2006.01)

(52) U.S. Cl. ........ 428/172; 428/109; 428/113; 428/151; 428/204; 428/211.1; 428/213; 428/218; 428/537.1; 52/313; 52/390

(58) Field of Classification Search .................. 428/107, 428/109, 113, 151, 172, 212, 213, 218, 537.1, 428/204, 211.1; 52/313, 390
See application file for complete search history.

(56) References Cited

U.S. PATENT DOCUMENTS

| | | | | |
|---|---|---|---|---|
| 2,666,726 | A * | 1/1954 | King et al. | 156/220 |
| 5,470,631 | A * | 11/1995 | Lindquist et al. | 428/105 |
| 2004/0123542 | A1 | 7/2004 | Grafenauer | |
| 2004/0126550 | A1 * | 7/2004 | Grafenauer | 428/212 |
| 2007/0207296 | A1 | 9/2007 | Eisermann | |

FOREIGN PATENT DOCUMENTS

| | | |
|---|---|---|
| AT | 367137 | 6/1982 |
| DE | 102 20 501 | 11/2003 |
| DE | 102 52 863 | 5/2004 |
| DE | 103 44 598 | 3/2005 |
| DE | 10 2004 053 131 | 5/2006 |
| DE | 10 2005 020 890 | 11/2006 |
| EP | 1 681 146 | 7/2006 |
| EP | 1 859 912 | 11/2007 |
| WO | 01/48333 | 7/2001 |
| WO | 03/095202 | 11/2003 |

OTHER PUBLICATIONS

European Search Report for EP 08 00 7440.

* cited by examiner

*Primary Examiner* — Donald Loney
(74) *Attorney, Agent, or Firm* — Andrew M. Calderon; Roberts Mlotkowski Safran & Cole, P.C.

(57) ABSTRACT

A building board, in particular a flooring panel, with a core comprising at least one upper layer and one lower layer of wood fibers or wood chips glued with an adhesive and pressed to one another, which is provided on at least its top side with a pattern that is covered with a sealing coat and in which sealing coat a structure corresponding to the pattern is embossed, is characterized in that at least the chips of the upper layer are glued with an adhesive having thermoplastic properties, and the upper layer has recesses formed at least directly beneath the pattern.

17 Claims, 1 Drawing Sheet

BUILDING SLAB, FLOOR PANELS IN PARTICULAR, AND METHOD OF MANUFACTURING THE SAME

CROSS REFERENCE TO RELATED APPLICATIONS

The present application claims priority under 35 U.S.C. §119 to German Patent Application No. 10 2007 019 978.5, filed on Apr. 27, 2007, the contents of which are incorporated in their entirety herein by reference.

BACKGROUND OF THE INVENTION

1. Field of the Invention

The invention relates to a building board, in particular a flooring panel, with a core comprising at least one upper layer and one lower layer of wood fibers or wood chips glued with an adhesive and pressed to one another, which is provided on at least its top side with a pattern that is covered with a sealing layer in which a structure corresponding to the pattern is embossed.

2. Discussion of Background Information

A building board of this type is known, e.g., from DE 102 52 863. Building boards with a core of wood material have been commercially available for many years as laminate panels as a substitute for parquet flooring. In addition to mechanical and hygroscopic requirements, flooring panels must also meet high demands in terms of visual impression and feel. The main task in this respect is to create the impression of a natural material, e.g., wood or stone. However, fantasy patterns are also used.

Generic flooring panels therefore not only have a decorative layer, which can be embodied as a separate printed paper ply or printed directly onto the core of the panel, but also have a relief embossed into the surface. This surface structure can be embodied in a flat or fine manner, wherein both structures can overlap. With high-quality products, they are exactly matched to the pattern beneath. One skilled in the art refers to this as a pattern-synchronous surface structure.

DE 102 20 501 discloses a directly laminated board, in which a dry paper without resin impregnation is used as decorative paper and has a great absorption capacity for the resin of the adhesive layer, with which the decorative paper is attached to the core. At deeply embossed points of the cover layer the decorative paper can dip into the adhesive layer without being squashed against a hard surface of the core. A gentle processing of the decorative paper is to be possible during the hot pressing in this manner.

The disadvantage is that surface structures of this type are limited in their depth. Conventionally, they have a depth of approx. 100 μm. Deeper structures can be achieved, if at all, only with increased compacting forces and long pressing times. Greater compacting forces require complex presses and reinforced tools. Long press times have a negative impact on the mechanical properties of the support board of wood material.

AT 367 137 discloses a weather-resistant board of wood-fiber materials that is characterized in that it comprises on the one hand the support material composed of lignocellulose-containing fibers and/or chips effecting the shaping and dimensional stability and/or organic materials, binders and additives otherwise treated, and on the other hand a firmly adhering outer layer from the group of weather-resistant vulcanizable elastomers, which are firmly connected to one another without additional connection of the medium chiefly through reciprocal mechanical anchoring in the marginal zones facing one another of carrier substance and outer coating.

SUMMARY OF THE INVENTION

Based on this problem, the invention improves a generic building board such that it has deeper surface structures and to disclose a method for its manufacture.

This is attained according to the invention in that the chips of the upper layer of the core are glued with an adhesive having thermoplastic properties, and the upper layer has recesses formed at least directly beneath the pattern.

The composition of the adhesive for the upper layer is advantageously different from the composition of the adhesive for the lower layer. The adhesive for the upper layer thereby has better thermoplastic properties than the adhesive for the lower layer.

The adhesive for the upper layer thereby preferably contains alone or in any desired combination:

A PF-novolak and/or

An acrylate dispersion and/or

An ethylene vinyl acetate dispersion (EVA) and/or

A polyvinyl acetate dispersion (PVAc) and/or

A polyvinyl alcohol (PVA) and/or

A silane-based system.

If a core of this type is used to produce a building board, the increased thermoplastic properties of the upper layer are activated through the increased temperature and the increased pressure during the concluding pressing of the support board with the pattern and the wear-resistant layer. This layer of wood fibers or wood chips glued with an adhesive having thermoplastic properties has an increased plasticity, so that a post-forming is possible. The upper layer of the core of the building board therefore forms a postformable layer. Through its increased plasticity, deep surface structures can be easily embossed into the building board.

Preferably the thickness of the postformable layer is approx. one third of the thickness of the wood material core. Since the increased plasticity of the core is required only in the uppermost layer of the core, costs can be saved in this manner.

Preferably the depth of the surface structure embossed into the surface is at least in part more than 500 μm. In order to create an impression as similar as possible to a natural material, the relief is matched to the pattern of the decorative layer.

The decorative layer can be embodied as a printed paper ply that is placed on the wood material core and later pressed. Advantageously, the decorative layer is embodied as at least one paint coat printed directly onto the core. Analog as well as digital printing methods can hereby be used.

The decorative layer is covered with a sealing coat. It can comprise at least one layer of hardenable varnish. Preferably the sealing coat comprises at least one layer of transparent synthetic resin, e.g., based on UF, MF or MUF. Optionally, additives, e.g., corundum, which increase the abrasion-resistance of the resin layers, can be added to these layers.

The sealing coat can also be embodied as a resin-impregnated overlay. A counteracting layer is advantageously applied to the underside of the wood material core. This counteracting layer can be embodied as a resin-impregnated paper ply. It preferably comprises at least one varnish layer or resin layer applied directly to the lower parts. Its layer thicknesses are determined by the application on the topside of the wood material core in order to rule out a warpage of the board.

The method according to the invention for producing a building board from several plies of scattered wood fibers or wood chips glued with an adhesive and pressed to form a core provides that the wood fibers or wood chips for at least the last ply are glued with an adhesive having thermoplastic properties. Advantageously only the wood fibers or wood chips of the last ply are glued with an adhesive having thermoplastic properties. The increased plasticity of the postformable layer is required in the subsequent pressing of a deep relief (surface structure) only in the uppermost layer of the core, so that production costs can be saved in this manner.

Preferably the adhesive having thermoplastic properties is applied to the fibers or chips in addition to an adhesive having thermosetting properties. Thereby, firstly all wood fibers or wood chips that are to be used in the production of the building board can be glued with an adhesive having thermosetting properties, before a part of these wood chips or wood fibers is separated and additionally glued with an adhesive having thermoplastic properties. These separated wood chips or wood fibers are later, if necessary after prior dissolution, scattered, as the last layer of the scattered mat that is formed from the wood chips or wood fibers that have not been glued with an adhesive having thermoplastic properties.

BRIEF DESCRIPTION OF THE DRAWINGS

Exemplary embodiments of the invention will now be explained in more detail based on the following drawings.

DETAILED DESCRIPTION OF THE PRESENT INVENTION

Figure 3:
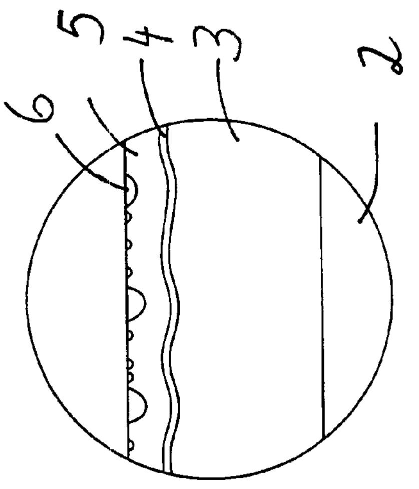
FIG. 3 shows an enlarged section from FIG. 2.
Figure 2:
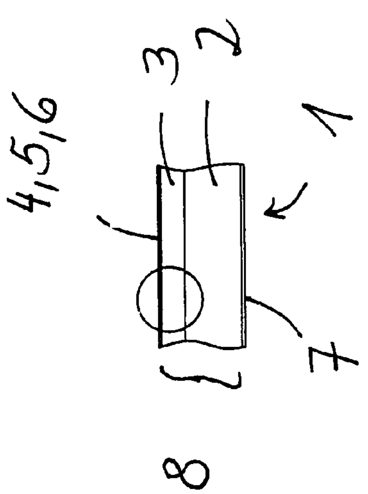
FIG. 2 shows a section through the building board along the line A-A in FIG. 1.
Figure 1:
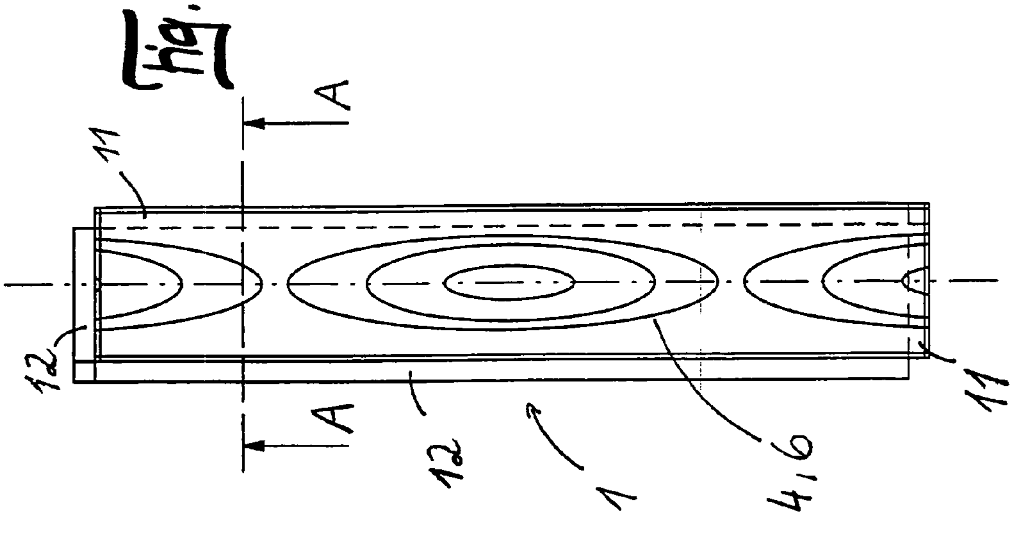
FIG. 1 shows a plan view of a building board.

Building boards of a wood material are made by wood fibers or wood chips first being glued with a conventional adhesive and dried—which is explained in greater detail below. The fibers or chips thus prepared are scattered in several plies to form a cake (mat), the main direction of the fibers or chips of the individual plies intersecting. This cake is, e.g., scattered continuously and fed to a continuous press in which it is then pressed under the influence of pressure and temperature to form a board in the desired thickness. The thermosetting adhesive bonded with the fibers/chips thereby hardens. The support board produced continuously in this manner is subsequently divided and can then be further finished in that, e.g., a pattern and a wear-resistant layer are placed on the top side and subsequently pressed with the core (the support board). This building board can then be divided further to form furniture boards or flooring panels.

The building board according to the invention, in this case a flooring panel 1, comprises the core 8, the decorative layer 4 applied to the core 8, which decorative layer is covered by a sealing coat 5 and the counteracting layer 7 applied on the underside of the core 8. A surface structure 6 is embossed into the sealing coat 5, which surface structure corresponds to the pattern 4 (e.g., a wood grain). The core 8 comprises a lower layer 2 and an upper layer 3. The lower layer 2 comprises wood fibers or wood chips glued in a conventional manner, and the upper layer 3 comprises wood chips or wood fibers that are glued alone or additionally with an adhesive having thermoplastic properties. In order to be able to connect the panel 1 to other panels, it is provided on two sides respectively with a groove 111 and a tongue 12.

As can be seen from FIG. 3, the upper layer 3 is deformed directly beneath the decorative layer 4, which was generated during the embossing of the surface structure 6 in the sealing coat 5 or during the pressing of the decorative layer 4 and sealing coat 5 and counteracting layer 7 with the core 8. The upper layer 3 is postformable because it is given the adhesive with thermoplastic properties, so that surface structures 6 with a depth of more than 500 μm can occur during embossing without presses with higher pressures being used or longer pressing times being necessary compared to the previous board finishing.

UF or MUF adhesives are used as conventional adhesives for producing fiber boards, chipboards and OSB (oriented strand board). Conventional MUPF and PMDI adhesives continue to be conventional adhesives in the production of chipboards and OSB.

Either a PF novolak, an acrylate dispersion, an ethylene vinyl acetate dispersion (EVA), a polyvinyl acetate dispersion (PVAc), a polyvinyl alcohol (PVA) and/or silane-based systems is used as a further adhesive to improve the postformability. The aforementioned adhesives can also be used alone or combined, as desired.

Since the further adhesive additionally incurs costs, it is advantageous if the addition is limited only to the part of the core 8 that is to be postformed. This is an area of 1-2 mm, which corresponds approximately to an area of 10-30% of the board thickness.

The production of a wood fiber board as a support board (wood material core) is carried out in that during the gluing of the fibers that are subsequently to be scattered to form the cake, a part is separated from the actual fiber stream and separately glued and scattered at least as the last ply on a fiber mat previously laid from the actual fiber stream to form a cover layer. The wood fiber board is then produced conventionally. However, it has the postformable cover layer.

Deviating from the conventional methods for manufacturing wood fiber boards of this type, it is provided after the drying of the conventionally glued fibers to separate a portion and to glue it with another adhesive in a further gluing station of a so-called dry gluing. The postformable layer can be the last layer. However, of course several plies can also be scattered, which are additionally glued and are to form the postformable layer, which depends on the layer thickness desired. Since the postdeformability of the core 8 immediately beneath the decorative layer 4 is important according to the invention, of course the core 8 can also be made entirely of wood fibers or wood chips that are glued with an adhesive having thermoplastic properties.

In the above discussion of thermoplastic properties or better thermoplastic properties it must be taken into account that a strict distinction cannot be made between a thermoset and a thermoplastic regarding the adhesive that is used for the gluing. The additional adhesives explained above are thermoplastic. If they are used in addition to the adhesives conventionally used in the gluing, better thermoplastic properties are generated. How high the thermoplastic properties have to be depends on which structure depths are to be pressed or how high the degree of deformation of the core 8 is to be directly beneath the decorative layer 4.

The invention claimed is:

1. A building board with a core comprising:

at least one upper layer and one lower layer of wood fibers or wood chips glued with an adhesive and pressed to one another; and a printed pattern provided on a top side of the core that is covered with a sealing coat, wherein the sealing coat includes an embossed surface structure corresponding to the printed Pattern, the adhesive of at least the upper layer includes thermoplastic properties, and the upper layer of the core includes the embossed surface structure matched with the printed pattern.

2. The building board according to claim 1, wherein a composition of the adhesive for the upper layer is different from a composition of the adhesive for the lower layer.

3. The building board according to claim 2, wherein the adhesive for the upper layer has higher thermoplastic properties than the adhesive for the lower layer.

4. The building board according to claim 1, wherein the adhesive for the upper layer contains alone or in any desired combination at least one of:

a PF-novolak;

an acrylate dispersion;

an ethylene vinyl acetate dispersion (EVA);

apolyvinyl acetate dispersion (PVAc);

a polyvinyl alcohol (PVA); and a silane-based system.

5. The building board according to claim 1, wherein a thickness of the upper layer is approximately one third of a thickness of the core.

6. The building board according to claim 5, wherein the upper layer is a postformable upper layer.

7. The building board according to claim 1, wherein the surface structure has at least in part a depth of at least 500 μm.

8. The building board according to claim 1, wherein the printed pattern is embodied as a printed paper ply.

9. The building board according to claim 1, wherein the printed pattern is embodied as at least one paint coat printed directly onto the core.

10. The building board according to claim 1, wherein the sealing coat comprises at least one varnish layer hardenable by UV or electron beams.

11. The building board according to claim 1, wherein the sealing coat comprises at least one resin layer, on a basis of UF, MF, MUF.

12. The building board according to claim 11, further comprising abrasion-resistant particles added to the sealing coat.

13. The building board according to claim 1, wherein the sealing coat is embodied as a resin-impregnated overlay.

14. The building board according to claim 1, further comprising a counteracting layer applied to an underside of the core.

15. The building board according to claim 14, wherein the counteracting layer is embodied as a resin-impregnated paper ply.

16. The building board according to claim 14, wherein the counteracting layer is embodied as a directly applied varnish layer or resin layer.

17. A building board comprising:

an upper layer and a lower layer of wood fibers or wood chips glued with an adhesive and pressed to one another by an adhesive, the adhesive for the upper layer having thermoplastic properties, which are different than properties of the adhesive for the lower layer;

a printed pattern provided on a top side of the upper layer that is covered with a sealing coat having an embossed surface structure corresponding to the printed pattern, wherein the upper layer includes the embossed surface structure formed to match the printed pattern.

* * * * *